(No Model.)

J. H. OSBORNE.
VEHICLE POLE.

No. 500,602.  Patented July 4, 1893.

Witnesses:

John H. Osborne
Inventor:

by Wm. Moore
Atty.

UNITED STATES PATENT OFFICE.

JOHN H. OSBORNE, OF UNION CITY, INDIANA.

VEHICLE-POLE.

SPECIFICATION forming part of Letters Patent No. 500,602, dated July 4, 1893.

Application filed September 24, 1892. Serial No. 446,798. (No model.)

*To all whom it may concern:*

Be it known that I, JOHN H. OSBORNE, a citizen of the United States, residing at Union City, in the county of Randolph and State of Indiana, have invented certain new and useful Improvements in Vehicle-Poles, of which the following is a specification.

My invention relates to improvements in vehicle poles, and refers specially to novel means for connecting the parts of the circle bar with the pole and to the adjustable coupling connection between the circle bar and the draw-irons or vehicle-gear.

The leading object of my invention is the provision of simple, durable and inexpensive means for the above purposes which may be used jointly or separately with a vehicle pole and which will be thoroughly efficient for the purposes intended.

To attain the desired objects the invention consists of devices for the purposes named embodying novel features of construction and adaptation for service as will appear from the drawings and description.

In order that the details of construction and the manner of using my improvements may be understood I have shown the improvements in the accompanying drawings, in which—

Figure 1:
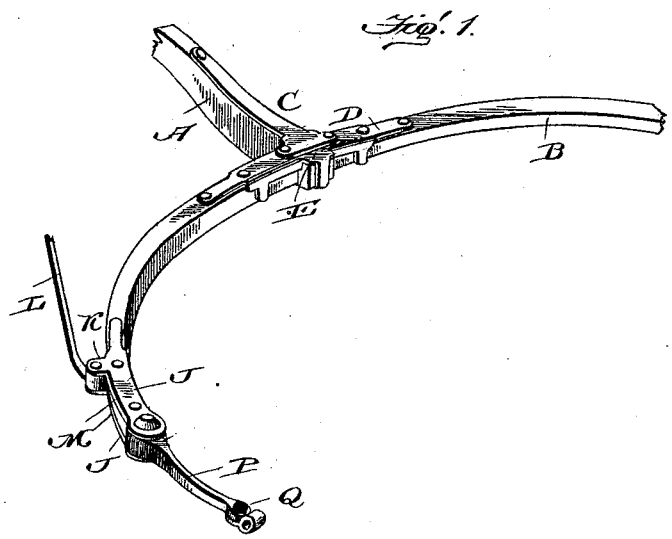
Figure 2:
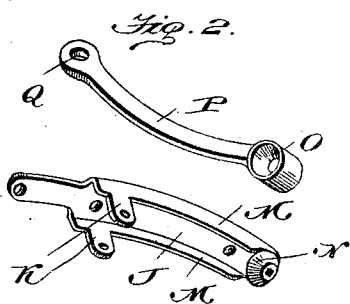
Figure 3:
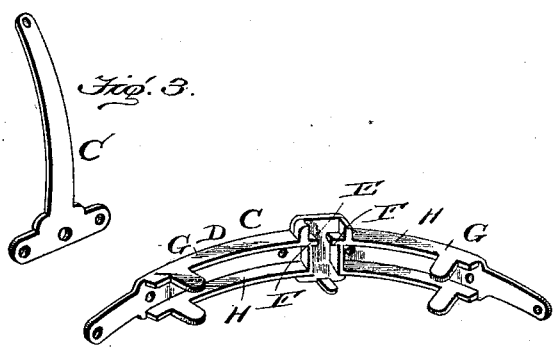

Figure 1 represents a perspective view of a vehicle pole provided with my improvements. Fig. 2 represents a detail perspective view enlarged of the adjustable coupling connections. Fig. 3 represents a detail perspective view enlarged of the connections between the pole proper and the parts of the circle bar.

I would here state that while I generally use the two connections together still they may be used separately and perform their respective functions in a thorough manner.

In the drawings A designates the pole proper and B designates the circle bar the parts of which are connected to the pole by the connection C. The connection C consists of the plate D which is secured to the rear end of the pole, the socket E at the inner end of said plate which receives the inner end of the pole and is formed with the inward extending ribs or lugs F which enter the wood and the curved arms G which are formed with the ribs or flanges H and thereby receive and form sockets for the parts of the circle bar, and the whole connection is secured by bolts and nuts, and as clearly shown securely attaches the pole and circle bar together and properly distributes the strain on the parts.

The adjustable coupling consists of the two plates J for each end of the circle bar, said plates being rigidly secured to the circle bar having the lips or lugs K to which the inner ends of the brace bars L are connected, the flanges M for partially inclosing the upper and lower sides of the circle bar and the ends are formed with the apertured conical lugs N, which bear in the conical cups or bearings O on the bars P having at their free ends the loops or eyes Q for connection with the draw irons or other suitable part of the vehicle as is evident. It will thus be seen that I provide a simple, durable and cheap device for connecting the two parts of the circle-bar with the pole proper which will withstand the strain to which the parts are subjected and will distribute the strain equally on the parts. It will also be seen that I provide a simple, durable and cheap means for connecting the circle bar with the vehicle which will be adjustable to vehicles having their draw-irons or shackles different distances apart and the friction between the cones and cups will hold the connections rigid under all circumstances.

The couplings can be easily removed and used in connection with any vehicle as the coupling connections can be adjusted to any vehicle.

I claim as my invention—

1. The herein described device for use on vehicle poles, consisting of the metal part or open casting having the arm for lying on one face or side and for attachment to the pole, the socket at the inner end of said arm to receive the end of the pole and the arms or branches having the flanged edges for inclosing the sides of the circle bar, substantially as described.

2. The herein described device for use on vehicle poles, consisting of the metal part or casting having the arm for attachment to the pole, the socket to receive the inner end of pole and formed with inward extending lugs, and the two arms for securing the parts of the circle bar, substantially as described.

3. The herein described device for use on vehicle poles, consisting of the two plates adapted to be attached one on each side or face to the ends of the circle bar and formed with lugs forming trunnions, and the coupling bars having cupped bearings to receive said trunnions, and a single bolt passing through the trunnions and cupped bearings and forming a pivot, substantially as described.

4. The herein described device for use on vehicle poles, consisting of the plates adapted to be attached to the ends of the circle-bar and having conical lugs on their inner ends, the coupling bars having conical bearings to receive said lugs, a single bolt passing through the conical lugs and bearings to form a pivot, ears formed on the plates to receive the brace bars, and the loops or eyes on the coupling bars for connection with the draw irons or the like, substantially as described.

5. The herein described device for use on a vehicle pole, consisting of the two flanged plates having the conical trunnions and the lugs or lips, the brace bars connected to said lips, the coupling bars having the conical friction bearings, and the loops or eyes on the coupling bars, substantially as described.

In testimony whereof I affix my signature in the presence of two witnesses.

JOHN H. OSBORNE.

Witnesses:
L. D. LAMBERT,
WEBSTER LAMBERT.